United States Patent
Mehas et al.

(10) Patent No.: US 11,949,229 B2
(45) Date of Patent: Apr. 2, 2024

(54) COORDINATING VOLTAGE AND FREQUENCY CHANGES IN WIRELESS POWER TRANSFER

(71) Applicant: Renesas Electronics America Inc., Milpitas, CA (US)

(72) Inventors: Gustavo Mehas, Mercer Island, WA (US); Nicholaus Smith, La Mesa, CA (US); Tao Qi, San Diego, CA (US); Jiangjian Huang, San Jose, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 541 days.

(21) Appl. No.: 16/894,346

(22) Filed: Jun. 5, 2020

(65) Prior Publication Data
US 2021/0384722 A1 Dec. 9, 2021

(51) Int. Cl.
*H02H 9/04* (2006.01)
*H02J 50/10* (2016.01)

(52) U.S. Cl.
CPC ............. *H02H 9/04* (2013.01); *H02J 50/10* (2016.02)

(58) Field of Classification Search
CPC .. H02H 9/04; H02J 50/10; H02J 50/80; H02J 50/12; H02J 50/005; H02J 7/00036; H02J 7/00712; H02J 7/00714; H02J 7/007182; H02J 50/20; H02J 50/60; H02J 50/90; H02M 7/217; H04B 5/0037; H04B 5/0075
See application file for complete search history.

(56) References Cited

U.S. PATENT DOCUMENTS

| | | | |
|---|---|---|---|
| 10,063,085 B2 * | 8/2018 | Bae | H02J 50/12 |
| 10,601,256 B2 | 3/2020 | Bakker et al. | |
| 10,630,109 B2 | 4/2020 | Smith et al. | |
| 2015/0115735 A1 | 4/2015 | Singh et al. | |

(Continued)

FOREIGN PATENT DOCUMENTS

WO 2017121672 A1 7/2017

OTHER PUBLICATIONS

Smith, "Renesas White Paper—Tuning Qi(R) and AirFuel(R)/PMA(R) Inductive Resonance Circuits for Optimal Efficiency," pp. 1-8. May 10, 2017 (Year: 2017).*

(Continued)

*Primary Examiner* — Jared Fureman
*Assistant Examiner* — Michael J Warmflash
(74) *Attorney, Agent, or Firm* — Haynes and Boone, LLP (57) ABSTRACT

A wireless transmitter coordinates changes in the transmitter's input or output voltages with changes in the transmitter's operating frequency to counteract the transmitter's output power changes while changing the voltages. When the voltages are being increased, the output frequency is moved away from the resonant frequency. Consequently, the output power increase due to the increased voltages is restrained by the frequency change. Before or after the voltage increase, increased output power can be obtained by changing the output frequency while the input and output voltages are held constant or near constant. Some embodiments follow similar procedures when reducing the transmitter's input or output voltages. Calibration is performed before power transfer to determine suitable voltage and frequency profiles for voltage change operations. Other features are also provided.

20 Claims, 5 Drawing Sheets (56) References Cited

U.S. PATENT DOCUMENTS

| | | | |
|---|---|---|---|
| 2015/0215006 A1* | 7/2015 | Mehas | H02M 7/219 |
| | | | 307/104 |
| 2016/0261144 A1* | 9/2016 | Bae | H02J 50/90 |
| 2016/0285278 A1* | 9/2016 | Mehas | H02J 50/12 |
| 2018/0269724 A1* | 9/2018 | Smith | H02J 50/12 |
| 2018/0301938 A1* | 10/2018 | Mehas | H04B 5/0081 |
| 2018/0337559 A1 | 11/2018 | Smith et al. | |
| 2019/0140489 A1 | 5/2019 | Liu et al. | |

OTHER PUBLICATIONS

Abdolkhani "Fundamentals of Inductively Coupled Wireless Power Transfer Systems," We are IntechOpen, the World's Leading publisher of Open Access Books built by Scientists, for Scientists, Chapter 1, pp. 3-25, 2016.

Renesas, "Wireless Power Receiver for Low Power Applications," P9222-R Datasheet, pp. 1-53, Sep. 27, 2019.

Renesas, "Wireless Power Transmitter for Smartphones with Fast Charging Modes and 30W Applications," pp. 1-4, Jul. 17, 2019.

Smith, "Renesas White Paper—Tuning Qi® and AirFuel®/PMA® Inductive Resonance Circuits for Optimal Efficiency," pp. 1-8, May 10, 2017.

U.S. Appl. No. 16/378,273, filed Apr. 8, 2019.

Wu, "Overview of Wireless Power and Data Communication," NXP Semiconductors, Wireless Power Consortium, pp. 1-21, May 6, 2020.

Zhong et al., "Maximum Energy Efficiency Tracking for Wireless Power Transfer Sysems," IEEE Transactions on Power Electronics, pp. 1-10, 2013.

* cited by examiner

Figure 1 fo = resonant frequency
V1 = initial VIN (e.g. 5V)
V2 = next higher VIN (e.g. 9V)

COORDINATING VOLTAGE AND FREQUENCY CHANGES IN WIRELESS POWER TRANSFER

TECHNICAL FIELD

Embodiments of the present invention relate to wireless power systems and, specifically, to coordinating voltage and frequency changes in wireless power transfer. Some embodiments reduce or avoid undesirable voltage spikes without slowing down the power transfer.

DISCUSSION OF RELATED ART

Mobile devices, for example smart phones, tablets, wearables and other devices are increasingly using wireless power charging such as accomplished by wireless power transfer (WPT). Wireless power transfer may involve a transmitter driving a transmit coil to produce a time-varying magnetic field, and a receiver with a receiver coil placed proximate to the transmit coil. The receiver coil receives the wireless power generated by the transmit coil and uses that received power to drive a load, for example to charge a battery. The receiver coil and the load can be part of a device such as a cell phone, PDA (personal digital assistant), computer, or other device, that is positioned relative to the transmitter coil to receive the power transmitted in the time-varying magnetic field.

There are multiple different standards currently in use for the wireless transfer of power. The more common standards for wireless transmission of power include the Alliance for Wireless Power (A4WP) standard and the Wireless Power Consortium standard, the Qi Standard. Under the Wireless Power Consortium, the Qi specification, a resonant inductive coupling system is utilized to charge a single device at the resonance frequency of the receiver coil circuit. In the Qi standard, the receiving device coil is placed in close proximity with the transmission coil while in the A4WP standard, the receiving device coil is placed near the transmitting coil, potentially along with other receiving coils that belong to other charging devices.

The wireless power system may further include data communications between the wireless power transmitter and the wireless power receiver of the wireless power system. The data communications may use the transmit coil and the receiver coil to exchange data, or may use other channels.

There is a need to avoid overvoltage conditions and other uncontrolled voltages, preferably without significant reductions in the speed of the wireless power transfer.

SUMMARY

In accordance with some embodiments of the present invention, a wireless transmitter coordinates the transmitter's input and/or output voltages with the transmitter's operating frequency to avoid spikes in the transmitter output power and the receiver's voltages when the transmitter voltages are increased. When the transmitter voltages are being increased, the operating frequency is moved away from the resonant frequency to counteract (restrain or eliminate) an increase in the transmitter output power. If higher output power is desired, it can be obtained before or after the voltage increase by moving the operating frequency closer to the resonant frequency while the transmitter voltages are held constant or near constant.

Some embodiments follow similar procedures when reducing the transmitter's input or output voltage: the voltage reduction is concurrent with moving the frequency closer to the resonant frequency to counteract output power changes.

These and other embodiments are further discussed below with respect to the following figures.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Figure 1:
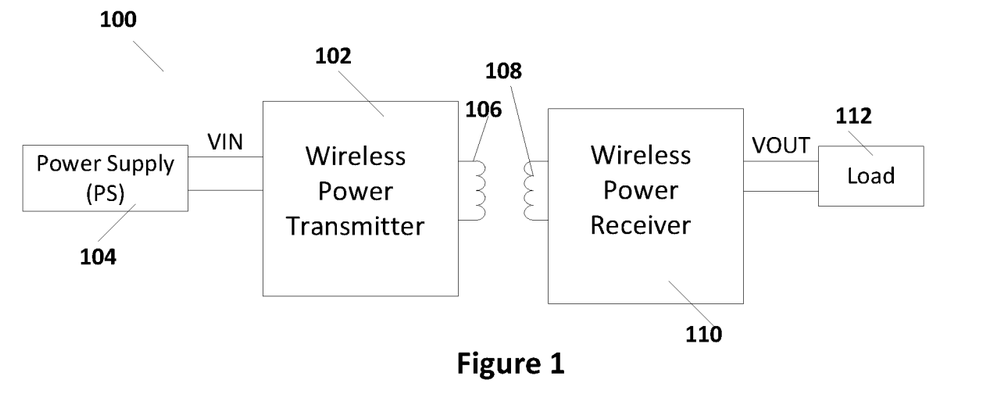
FIG. 1 illustrates a wireless power transfer system.

FIG. 1 illustrates a system 100 for wireless transfer of power. Wireless power transmitter 102 drives a coil 106 to produce a magnetic field. A power supply 104 provides power to wireless power transmitter 102. Power supply 104 can be, for example, a battery based supply, or may be powered by alternating current, for example 120V at 60 Hz. Wireless power transmitter 102 drives coil 106 at, typically, a range of frequencies, typically according to one of the wireless power standards. However, this scheme could be applicable to any frequency where it is practical to transfer power and/or information by means of magnetic coils irrespective of any standard that may exist.

There are multiple standards for wireless transmission of power, including the Alliance for Wireless Power (A4WP) standard and the Wireless Power Consortium standard, the Qi Standard. Under the A4WP standard, for example, up to 50 watts of power can be inductively transmitted to multiple charging devices in the vicinity of coil 106 at a power transmission frequency of around 6.78 MHz. Under the Wireless Power Consortium (WPC), the Qi specification, a resonant inductive coupling system is utilized to charge a single device at the resonance frequency of the device. In the Qi standard, coil 108 is placed in close proximity with coil 106 while in the A4WP standard, coil 108 is placed near coil 106 along with other coils that belong to other charging devices. FIG. 1 depicts a generalized wireless power system 100 that operates under any of these standards. In Europe, the switching frequency has been limited to 148 kHz.

As is further illustrated in FIG. 1, the magnetic field produced by coil 106 induces a current in coil 108, which results in power being received in a receiver 110. Receiver 110 receives the power from coil 108 and provides power to a load 112, which may be a battery, and/or to other components of a mobile device. Receiver 110 may rectify the AC signal obtained from coil 108 to provide DC voltage VOUT to load 112. See for example the following patent documents incorporated by reference herein: U.S. patent publications no. US 2019/0140489, published May 9, 2019 (inventors: Rui Liu et al.); no. US 2018/0337559, published May 22, 2018 (inventors: Smith et al.); no. US 2015/0115735, published Apr. 30, 2015 (inventors: Singh et al.); U.S. Pat. No. 10,601,256, issued Mar. 24, 2020 (inventors: Bakker et al.); U.S. patent application Ser. No. 16/378,273, filed Apr. 8, 2019; and international patent publication no. WO 2017/121672, published Jul. 20, 2017 (inventors: Staring et al.).

Transmitter 102 and receiver 110 wirelessly communicate with each other, possibly using their coils 106 and 108 as antennas, to control the transmitter's operating parameters as needed to optimize power transfer. The optimal power transfer may depend on the state of load 112, the physical position of the transmitter relative to the receiver, presence of foreign objects, environmental factors, and possibly other factors. For example, the optimal voltage and current values VOUT, TOUT provided to load 112 may depend on the mobile device power consumption. Also, if load 112 includes a battery, desired output voltage VOUT and output current values may depend on the battery type and, for a given battery, on the particular charging phase of the battery, and may vary during charging. Before the charging starts, receiver 110 and transmitter 102 communicate to set the transmitter operating parameters such as the voltage amplitude and/or current amplitude and/or frequency of the power transfer signal in transmit coil 106. When charging begins, receiver 110 periodically sends messages to transmitter 102 to adjust the transmitter operating parameters as needed.

Figure 2:
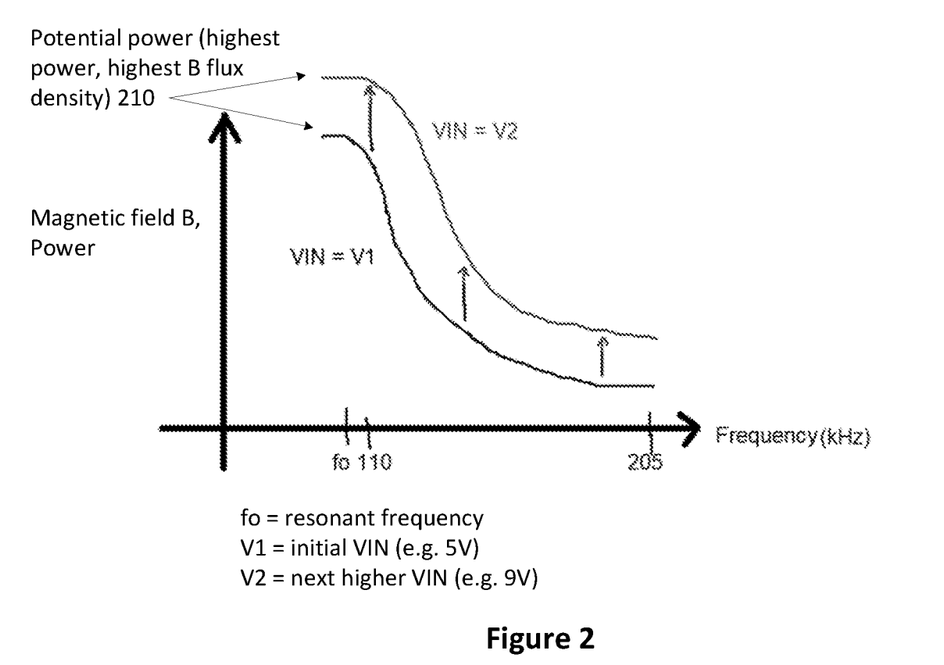
FIG. 2 illustrates a relationship between the transmitter's input voltage, output power, and operating frequency.

FIG. 2 illustrates an exemplary plot of the wireless power generated by transmit coil 106 versus the coil's frequency fin power transfer operation at different values of DC power supply voltage VIN which defines the voltage amplitude across the transmit coil 106. The power value is defined by the magnetic flux density B generated by the current in coil 106. For any given input voltage VIN received from power supply 104, and hence for any given voltage amplitude in coil 106, the power reaches its maximum value at the resonant frequency fo of the transmitter's resonant tank including the coil 106 and possibly other components (e.g. a capacitor, not shown). The maximum power operating points are shown at 210. However, to enable the transmitter to quickly correct non-optimal, and possibly dangerous, power transfer conditions determined by transmitter 102 based on messages from receiver 110 and/or the transmitter's own measurements, the transmitter can be operated at higher frequencies f, at which the B versus f plot has a high negative slope, so that the B value can be quickly adjusted by adjusting the frequency f.

When transmitter 102 is requested by receiver 110 to increase or decrease the input voltage VIN (in order to increase VOUT or the power provided to load 112 for example), transmitter 102 may send a message to power supply 104 to increase or decrease the VIN voltage. When VIN is increased or decreased, the magnetic field B increases or decreases accordingly if the operating frequency f is unchanged. For a fixed operating frequency f, the B-field will increase or decrease due to higher or lower Electro-Motive Force (EMF) applied at the fixed frequency and causing a higher Tx coil 106 current (see FIG. 2). If VIN is increased, e.g. from V1 to V2, the immediate result is that the receiver 110 will experience a jump in voltage VOUT and possibly in other voltages in the receiver. For example, in some embodiments, receiver 110 includes a rectifier (728 in FIG. 7B) generating a rectified DC voltage Vrect from the AC signal in coil 108; and a voltage regulator (760) generating VOUT from Vrect; see the aforementioned US patent publication no. 2015/0115735. When VIN is increased, Vrect and VOUT may jump in proportion to the gain of the Tx/Rx coils 106/108, the coupling of the coils to each other, the state of load 112, and the magnitude (V2−V1) of the VIN step applied. In some cases the Vrect voltage may only increase by a small amount, but in other cases (such as a large VIN step, or many fast VIN steps) the Vrect voltage can jump by a very high value, possibly outside of a safe operating range, resulting in overvoltage condition.

To ensure a safe operating range for Vrect, VOUT, and possibly other voltages, currents, and other parameters in receiver 110, the VIN increase could be performed in small steps, with a pause between the steps to allow the receiver 110 to settle after each step. But such operation undesirably slows down the charging process. Also, some power supplies 104 do not support small VIN step sizes.

Therefore, in some embodiments, the VIN increases are coupled with increasing the operating frequency f to move the frequency farther away from the resonant frequency fo. This process limits or eliminates the B increase when VIN is increased. The frequency can later be reduced again or set to any desired value after the VIN is settled at its new value.

Figure 3:
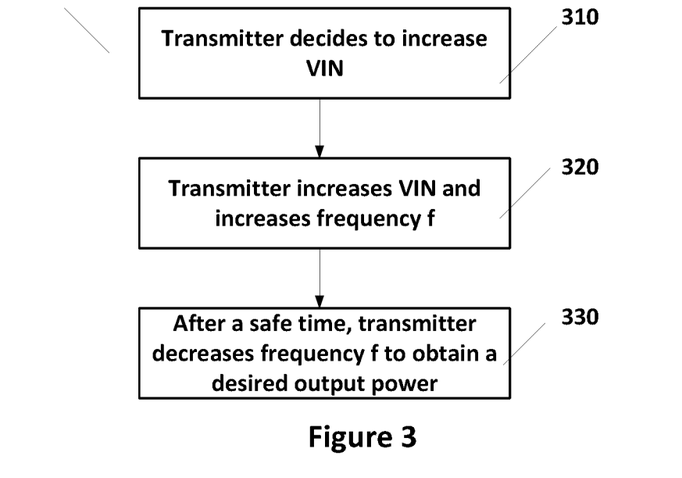
FIG. 3 is a flowchart of changing the transmitter's input voltage.

A suitable process 300 is shown in FIG. 3. At step 310, transmitter 102 decides to increase the voltage VIN from a value V1 to a higher value V2. This decision can be made, for example, in response to a message from receiver 110. The message may command the transmitter to increase VIN, or increase VOUT, or increase the power transmitted by transmit coil 106. The message may include the new value for VIN and/or VOUT and/or transmit power, and may include other parameters, for example, that increase should be done not all at once but in a certain number of steps separated by certain time intervals, as may be determined by calibration; this is discussed in more detail below.

At step 320, the transmitter increases the voltage VIN to V2 while also increasing the frequency f to limit the magnetic field B generated by transmit coil 106. Optionally, at step 330, after a period of time to allow the receiver to stabilize (this may be a fixed period of time, possibly determined by calibration at the start of the charging operation), the transmitter reduces the frequency f to a value corresponding to the desired operating power for transmit coil 106. Step 330 is performed if the desired operating frequency is different than the frequency at the end of step 320.

Figure 4:
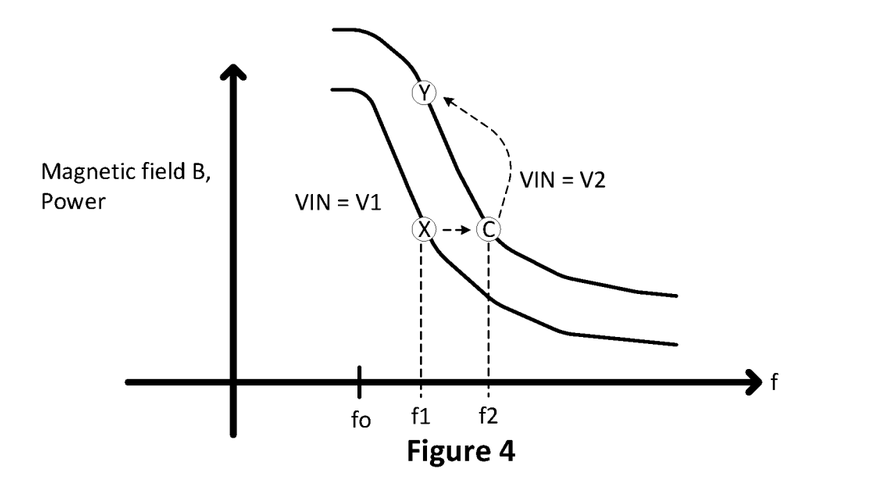
FIGS. 4, 5, and 6 are graphs for some embodiments of the process of FIG. 3.

FIG. 4 illustrates exemplary operating point transitions for steps 320, 330. Before step 310, the transmitter operating point is shown at X, with VIN at V1, and the operating frequency f at some value f1. At step 310, the transmitter has decided to move the operating point to Y, with VIN=V2 higher than V1, and f=f1. At step 320, the transmitter moves to operating point C, having VIN=V2 and the frequency f equal to some value f2 higher than f1. In some embodiments, f2 is chosen so that B remains constant, but this is not necessary: the B value may increase or decrease, but the increase is restrained by increasing the frequency f so as to avoid excessive voltages and currents in receiver 110.

At step 330, the transmitter reduces the frequency f to f1 (or some other suitable value) associated with the desired operating point Y while keeping VIN at V2. The operating point moves to Y.

Figure 5:
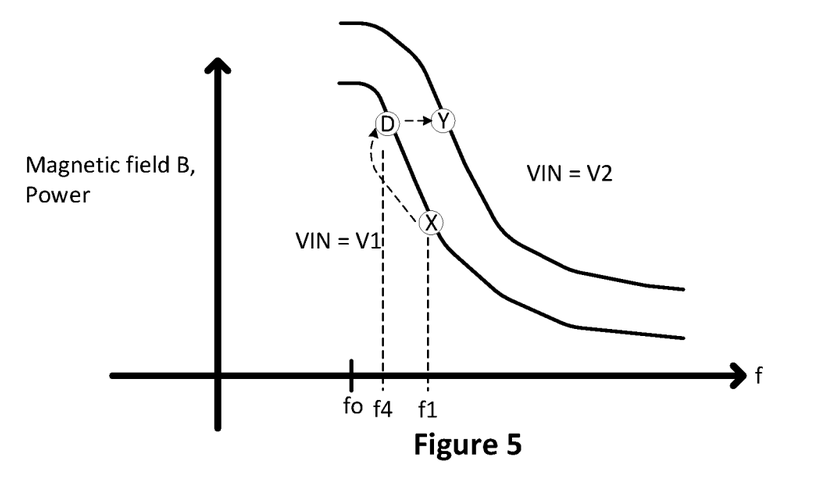

FIG. 5 shows another implementation in which the step 330 precedes the step 320: the operating point first moves from X to D by keeping the VIN constant at V1 but reducing the operating frequency to a value f4. Then the operating point moves from D to Y by increasing the frequency (possibly back to f1) and increasing VIN to V2. In the D-to-Y move, due to the frequency increase, the magnetic field B stays constant or increases by only a small amount, to limit the voltage and current increases in the receiver.

Other transitions paths from X to Y are also possible. For example, first the frequency f may be reduced to move the operating point from X to some point along the curve VIN=V1 but not all the way up to D; the input voltage VIN stays at V1. Then the operating point may move from VIN=V1 to VIN=V2 while increasing the frequency to keep the magnetic field B constant or near constant. Then the frequency may be reduced to move the operating point to Y while keeping VIN at V2. In still other embodiments, VIN moves from V1 to V2 in a number of steps, each time keeping the magnetic field B constant due to the accompanying frequency increase; the frequency may be reduced before or after each of one or more steps.

Figure 6:
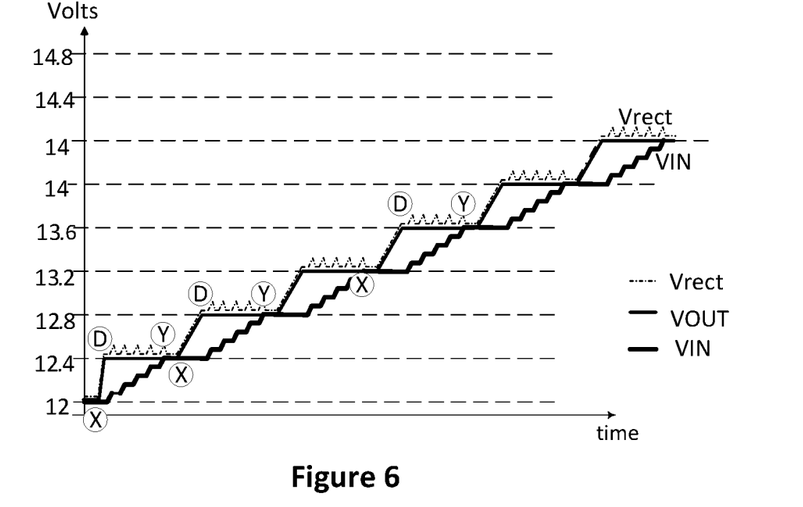

FIG. 6 illustrates a timing diagram of voltages VIN, Vrect, and VOUT in a VIN change from 12V to 14V in some embodiments of the process of FIG. 5. The VIN change occurs in five stages. In each stage, VIN is raised by 0.4 volts using the process of FIG. 5. Initially, the transmitter is at operating point X. For example, at time 0, all the voltages VIN, Vrect, VOUT are at 12V. Then the frequency f is reduced without changing VIN, to move the operating point to D. In the embodiment shown, Vrect and VOUT increase from 12V (point X) to 12.4V (point D), but VIN remains at 12V. Then VIN is increased from 12V to 12.4V in five steps to accomplish the transition from D to Y. A suitable pause (e.g. 200 ms) is provided between the steps to let the receiver voltages stabilize before the next step. The frequency f is increased concurrently with VIN in each step. The frequency may or may not be kept constant between the steps. During each step, Vrect rises slightly, then falls back to its 12.4V value before the next VIN step. VOUT is unchanged at 12.4V during the five steps. This operation is repeated to increase the three voltages from 12.4V to 12.8V, then from 12.8V to 13.2V, and so on. This example is illustrative and not limiting.

Thus in some embodiments, when Tx 102 receives a command from Rx 110 to increase the transmitter's output power, Tx 102 coordinates the VIN increase with a frequency increase (since higher frequency is further from the Tx resonance frequency): note the transition from X to C in FIG. 4, or from D to Y in FIG. 5. The frequency increase balances the B-field to keep it constant or almost constant. The resulting Vrect change is minimal or zero during the VIN increase. The power can be increased in a separate transition (e.g. from C to Y in FIG. 4, or X to D in FIG. 5) by reducing the frequency when the VIN is constant or almost constant. In some embodiments, such power balancing is also applied when VIN decreases (e.g. in response to the receiver 110 command to reduce the output power). The VIN decrease is balanced by a frequency decrease to maintain constant the B-field magnetic flux density applied to the Rx coil. The VIN decrease process (e.g. to decrease VIN from V2 to V1 in FIG. 4 or 5) is the reverse of the VIN increase process. For example, the VIN can be decreased by moving the operating point from Y to C, then to X in FIG. 4, or from Y to D, then to X in FIG. 5.

In some embodiments, when Tx 102 receives a command from Rx 110 to change the output power, TX 102 will determine the proper VIN level or levels for each step. The VIN change is accomplished by power supply 104 in response to a command from Tx 102. In some embodiments, power supply 104 receives AC power from a standard wall outlet, e.g. 110V, 60 Hz, and provides the DC VIN voltage. In some embodiments, power supply 104 is a travel adaptor that can generate VIN from different AC voltages and/or frequencies available in different countries.

Figure 7A:
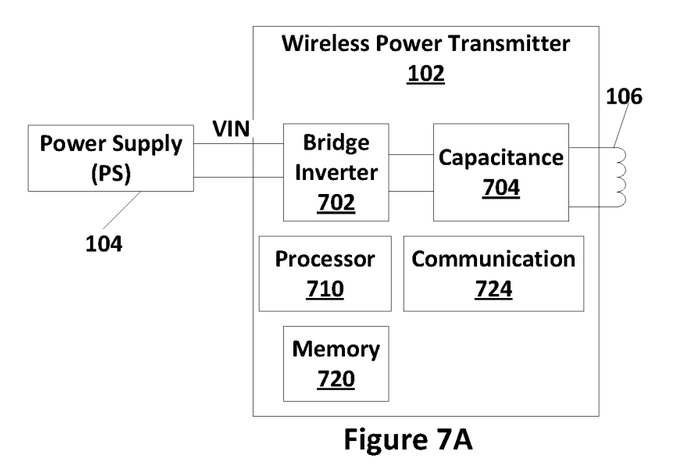
FIG. 7A illustrates a wireless power transmitter.

FIG. 7A shows some features of a transmitter 102 embodiment. (The term "transmitter" may or may not include the coil 106 and power supply 104). Bridge inverter 702 (full or half bridge inverter) generates an AC voltage from input voltage VIN. This AC voltage is provided to a resonant tank including the coil 106 and capacitor(s) 704 to obtain the wireless power transfer signal (WPT signal) provided to transmit coil 106. This WPT signal generates the magnetic field B. Processor 710 controls the Tx 102, and in particular controls the bridge inverter 702 (and the WPT signal frequency). Processor 710 uses memory 720 for data (e.g. including frequency and other settings) and possibly for computer instructions that program the processor. Communication module 724 is used to communicate with receiver 110 and/or power supply 104. For example, module 724 may instruct the processor 710 to operate the bridge inverter to superimpose a communication signal onto the WPT signal to send a message to receiver 110. In some embodiments (e.g. Qi embodiments using frequency shift keying (FSK) for transmitter messages), the communication signal does not change the transmit coil voltage amplitude, and only slightly varies the operating frequency f.

PS 104 and Tx 102 may communicate via a wire link.

Figure 7B:
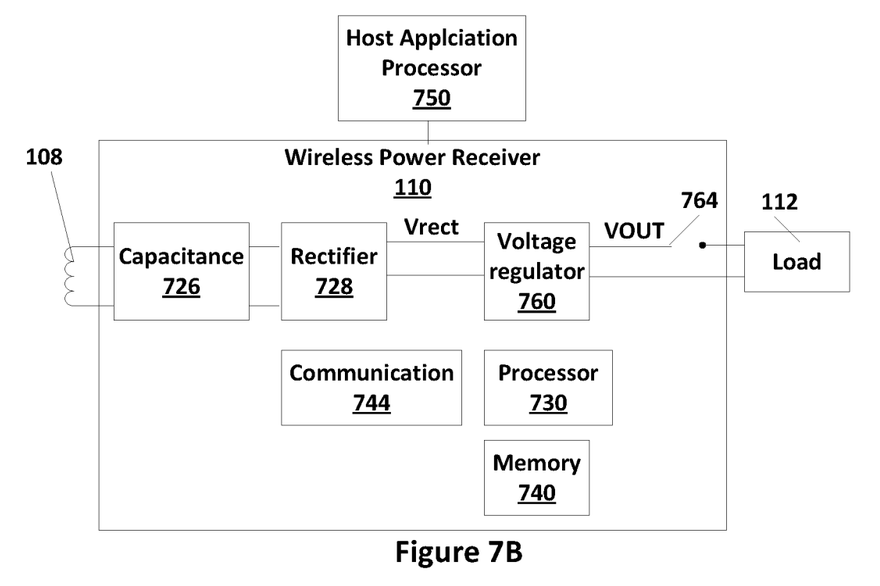
FIG. 7B illustrates a device with a wireless power receiver.

FIG. 7B shows some features of an embodiment of a mobile device with receiver 110. (The term "receiver" may or may not include the coil 108). Capacitance 726 and coil 108 form a resonant tank that may or may not have the same resonant frequency fo as the transmitter's tank 106/704. The AC current in the resonant tank is rectified by rectifier 728. The rectifier output voltage Vrect is regulated by voltage regulator 760, which outputs the voltage VOUT to load 112 via a switch 764. Processor 730 controls Rx 110. Processor 730 uses memory 740 for data (e.g. including various settings) and possibly for computer instructions that program the processor 730. Communication module 744 is used to communicate with Tx 102. For example, module 744 may instruct the processor 730 to modulate the resonant tank impedance to send a message to Tx 102.

In some embodiments, Rx 110 and Tx 102 store the output power level in their respective memories 720 (FIG. 7A), 740 (FIG. 7B). Each memory 720, 740 includes registers for digital storage. Each processor 710, 730 may be a software and/or firmware programmed computer processor, and/or may be a hardwired circuit, possibly FPGA (Field Programmable Gate Array) or some other electrically programmable type of circuit. Rx 110 is connected to host application processor (AP) 750 in the mobile device charged by transmitter 102. AP 750 may be part of load 112, and may include processors and/or memory (not shown).

Rx 110 and Tx 102 may communicate based on any WPT standards referenced above, or some other standards. In some embodiments, Tx 102 transmits messages via FSK (frequency shift keying), and Rx 110 transmits messages via ASK (amplitude shift keying), as known in the art. The invention is not limited to FSK or ASK.

Rx 110 and Tx 102 may agree on a sequence of power levels and/or VIN step magnitudes and step sequences and/or frequency transitions to be followed in a process of changing the transmitter's output power, and may store such sequences in their registers in respective memories 720, 740 for power changes requested by Rx 110 operating autonomously or under control of AP 750.

In some embodiments, before the charging operation begins, Rx 110 and Tx 102 agree on the initial output power level, and they record the initial power level in their respective memories 720, 740. The initial power level agreement may be made with participation of AP 750. This initial agreement may also cover handling of power level changes and interface, including power increases and VIN step sizes and sequences and the time intervals between the VIN steps, and possibly the corresponding changes in the operating frequency.

After each power level change, Rx 110 and Tx 102 may indicate to AP 750 when a power level change is complete, or may operate autonomously per their settings and programming in their memories 720, 740.

The Tx/Rx agreements described above can be made before charging begins. Making such agreements may involve execution of a learning algorithm (calibration) by Tx 102 and Rx 110 to determine appropriate frequency changes for each VIN step based on the transmitter output power at the time when the power level change is initiated. Such calibration may be performed at step 810 (FIG. 8) further described below.

In the learning algorithm, Tx 102 may perform a VIN and/or frequency change, and wait for a message from Rx 110 to indicate the resulting Vrect value and/or Vrect change, and possibly to indicate whether an overvoltage or other undesirably high voltage condition has occurred. The Rx 110 can send the resulting values to Tx 102 in a control error packet (CEP) under the Qi standard for example, or in some other type of message.

The data describing the VIN and frequency levels and changes, and the resulting Vrect changes, can be saved as a lookup table in each of memories 720, 740 (possibly non-volatile memories) during calibration. Alternatively or in addition, such data can be obtained during charging, and saved as the look-up tables for further reference in the same charging operation and/or subsequent charging operations. When a Vrect change is needed during charging, Rx 110 can command Tx 102 to accomplish corresponding VIN and/or frequency changes. This command can specify the target VIN and/or frequency values (from the Rx 110 look-up table) and/or the target Vrect or VOUT value. Tx 102 can consult its look-up table and determine the appropriate transitions (e.g. as in FIG. 4 or 5), the number of VIN steps, the timing intervals between the steps, and possibly other parameters needed to obtain the new Vrect.

Figure 8:
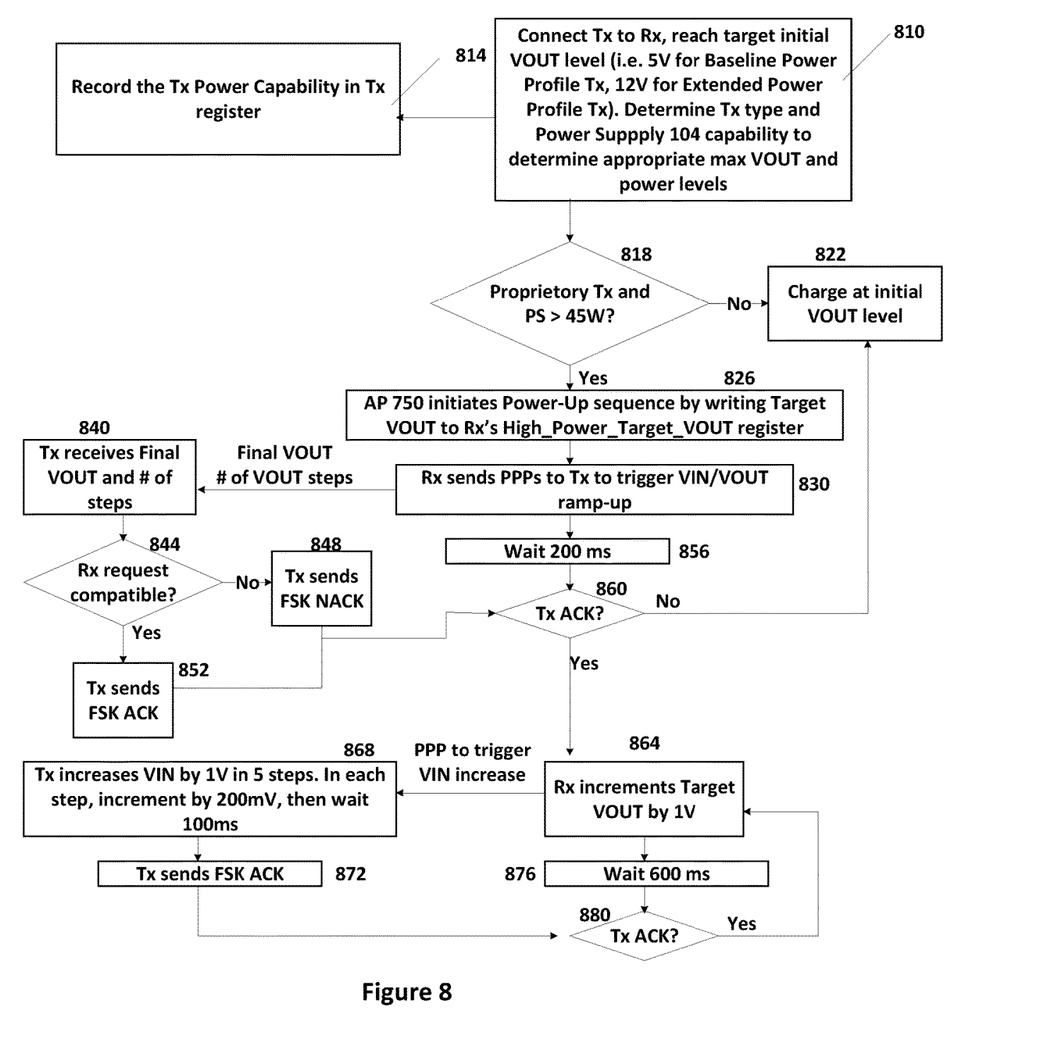
FIG. 8 is a flowchart of a process performed to adjust the transmitter voltages.

FIG. 8 is an exemplary flowchart of calibration and charging. At step 810, Tx 102 establishes a wireless connection with Rx 110, and calibration is performed as described above, before Rx 110 connects the VOUT terminal to load 112 (i.e. when the switch 764 is still open). Before the calibration starts, Tx 102 and Rx 110 establish, possibly with participation of AP 750, a target initial VOUT level according to any suitable protocol. For example, for the Qi protocol, the target initial VOUT level may be 5V if Tx 102 operates according to BPP (Baseline Power Profile), or 12V if Tx 102 operates according to EPP (Extended Power Profile). Also, based on the Tx 102 type and PS 104 supply capability and Rx 110 properties, Tx 102 and Rx 110 set the initial maximum VOUT and power levels. The PS 104 capability is determined by Tx 102 communicating with PS 104. Rx 110 and Tx 102, and possibly AP 750, record the established values in their respective registers at step 814. Then calibration is performed as described above.

At step 818, Tx 102 and Rx 110 determine if they both support an embodiment of protocols described herein with respect to FIGS. 3-6. If not, charging is performed as in a conventional process at step 822, using the target initial VOUT level established at step 810.

If both Rx 110 and Tx 102 support a protocol as in FIGS. 3-6, then at step 826 the AP 750 initiates the charging operation by writing the target VOUT to an RX 110 register. The target VOUT is established by Rx 110 to maximize its performance based on the properties of power supply 104, Tx 102, and Rx 110.

At step 830, Rx 110 sends one or more PPPs (proprietary protocol packets) to Tx 102 to trigger the VIN/VOUT ramp-up to raise VOUT to a suitable value ("final VOUT voltage") established by Rx 110 at this phase of the charging operation. The PPPs may specify the final VOUT voltage and the number of VIN steps to achieve the final VOUT. These final VOUT and the number of steps may be established during calibration at step 810.

At step 840, Tx 110 receives the PPPs. At step 844, Tx 110 checks the PPPs to determine if the final VOUT and the number of steps are compatible with the calibration data and the PS 104 capability. If not, the Tx 110 sends a negative acknowledgement NACK to Rx 102 at step 848 (via FSK for example). Otherwise Tx 110 sends a positive acknowledgement ACK at step 852.

At step 856, Rx 102 waits for the Tx acknowledgement for a maximum time-out period, e.g. 200 ms. Then, if Rx 102 has not received a positive acknowledgement ACK, Rx 102 goes to step 822 to perform conventional charging.

If Rx 110 has received a positive acknowledgement ACK before the time-out at step 856, Rx 102 increases the target VOUT by a suitable value, e.g. 1 V, at step 864, and sends a PPP to Tx 102 to trigger the VIN increase. At step 868, Tx 102 receives the PPP and increases the VIN in a number of steps provided at step 830, e.g. 5 steps. Each VIN increase is 200 mv, and there is a predetermined pause, e.g. 100 ms, after each VIN increase. Each VIN increase is accompanied by a frequency increase as in FIG. 4 or 5. Then at step 872, Tx 102 sends an ACK to Rx 110. At step 876, Rx 102 waits for a predetermined time, e.g. 600 ms, for an ACK from Tx 110. If an ACK is received (step 880), the next iteration is performed starting at step 864. Otherwise some failure process is followed, e.g. step 822 is performed (conventional charging).

The invention is not limited to the embodiments described above. Some aspects of the invention are defined by the following clauses:

Clause 1 defines a wireless power transmitter for wireless power transfer (WPT), the transmitter comprising:

an input for receiving a WPT input signal (the WPT input signal can be VIN for example, or a DC signal obtained from VIN, or can be an AC signal);

an output for connection to a transmit coil;

a transmit circuit (e.g. 102) for converting the WPT input signal to a WPT output signal in the transmit coil;

wherein the transmit circuit is configured to increase a voltage amplitude of the WPT output signal while moving the WPT signal frequency away from a resonant frequency of a resonant tank comprising the transmit coil. (The WPT signal may or may not include the FSK or other communication signals. The WPT signal may be only a component of the entire signal transmitted by coil 106; the other component may be communication signals.)

2. The wireless power transmitter of clause 1, wherein moving the WPT signal frequency away from the resonant frequency reduces or eliminates an increase of a magnetic field and/or magnetic field's power generated by the transmit coil from the WPT signal when the WPT signal voltage amplitude is increased.

3. The wireless power transmitter of clause 1 or 2, wherein increasing the transmit coil voltage amplitude while moving the WPT signal frequency is performed in response to a WPT receiver's command.

4. The wireless power transmitter of clause 3, wherein the transmit circuit is further configured, in response to the command, before and/or after increasing the transmit coil voltage amplitude, to move the WPT signal frequency closer to the resonant frequency to increase the WPT signal power.

5. The wireless power transmitter of clause 4, wherein the transmit coil voltage amplitude is held constant while the WPT signal frequency moves closer to the resonant frequency.

6. The wireless power transmitter of any preceding clause, wherein the transmit circuit is configured to generate the WPT signal from an input signal, and increasing the transmit coil voltage amplitude comprises increasing an input signal voltage.

7. The wireless power transmitter of clause 6, wherein the input signal is a DC signal.

8. The wireless power transmitter of any preceding clause, wherein the transmit circuit comprises a memory, and is configured to engage in a calibration process with a wireless power receiver, the calibration process being performed when the wireless power receiver does not transfer power to a load, the calibration process comprising the transmitter transmitting wireless power to the receiver at a plurality of settings each of which defines the transmit coil voltage amplitude, the frequency, and one or more transitions of the transmit coil voltage amplitude and/or frequency, and the transmitter receiving, from the receiver, information on how each said setting affects a receiver voltage obtained in the receiver, and storing the settings and the corresponding information in the memory;

wherein during the WPT, when the receiver transfers power to the load, the transmitter receives the receiver's commands specifying desired values for the receiver voltage, and the transmitter executes the commands based on the information stored in the memory for the settings.

9. The wireless power transmitter of clause 8, wherein at least one setting defines, for at least one transition, a length of a time interval to follow the transition without changing the WPT signal voltage amplitude.

10. The wireless power transmitter of clause 8, wherein in the calibration process, the transmitter receives from the receiver, for at least one setting, an indication that the setting caused an excessively high voltage condition in the receiver and is not to be used in the WPT.

11. A method for wireless power transfer (WPT), the method comprising:

receiving, by a wireless power transmitter, an indication to increase a transmit coil voltage amplitude of a WPT signal transmitted by a transmit coil;

in response to the indication, increasing the transmit coil voltage amplitude, and moving the WPT signal frequency away from a resonant frequency of a resonant circuit comprising the transmit coil, to reduce or eliminate the WPT signal's power increase associated with increasing the transmit coil voltage amplitude.

12. The method of clause 11, further comprising, in response to the indication, before or after increasing the transmit coil voltage amplitude, moving the WPT signal frequency closer to the resonant frequency to increase the WPT signal power.

13. The method of clause 11 or 12, wherein the transmit coil voltage amplitude is held constant while the WPT signal frequency moves closer to the resonant frequency.

14. The method of any one or more of clauses 11 through 13, wherein the transmitter generates the WPT signal from an input signal, and increasing the transmit coil voltage amplitude comprises increasing an input signal voltage.

15. The method of clause 14, wherein the input signal is a DC signal.

16. The method of any one or more of clauses 11 through 15, wherein the transmit circuit comprises a memory, and is configured to engage in a calibration process with a wireless power receiver, the calibration process being performed when the wireless power receiver does not transfer power to a load, the calibration process comprising the transmitter transmitting wireless power to the receiver at a plurality of settings each of which defines the transmit coil voltage amplitude, the frequency, and one or more transitions of the transmit coil voltage amplitude and/or frequency, and the transmitter receiving, from the receiver, information on how each said setting affects a receiver voltage obtained in the receiver, and storing the settings and the corresponding information in the memory;

wherein during the WPT, when the receiver transfers power to the load, the transmitter receives the receiver's commands specifying desired values for the receiver voltage, and the transmitter executes the commands based on the information stored in the memory for the settings.

17. The wireless power transmitter of clause 16, wherein at least one setting defines, for at least one transition, a length of a time interval to follow the transition without changing the WPT signal voltage amplitude.

18. A wireless power receiver comprising:
an input for connection to a transmit coil;
an output for connection to a load; and
a receive circuit for converting a WPT input signal in the receive coil to provide power to the load;

wherein the receive circuit comprises a memory, and is configured to engage in a calibration process with a wireless power transmitter, the calibration process being performed when the wireless power receiver does not transfer power to the load, the calibration process comprising the receiving wireless power in the receive coil from a wireless power transmitter at a plurality of settings each of which defines a transmit coil voltage amplitude, a WPT input signal frequency, and one or more transitions of a transmit coil voltage amplitude and/or frequency, and the receiver sending, to the transmitter, information on how each said setting affects a receiver voltage obtained in the receiver, and storing the settings and the corresponding information in the memory;

wherein during the WPT, when the receiver transfers power to the load, the receiver sends to the transmitter commands specifying desired values for the receiver voltage.

19. The wireless power receiver of clause 18, wherein at least one setting defines, for at least one transition, a length of a time interval to follow the transition without changing the WPT signal voltage amplitude.

20. The wireless power receiver of clause 18 or 19, wherein in the calibration process, the receiver determines and sends to the transmitter information on whether at least one setting resulted in an excessively high voltage in the receiver.

The above detailed description is provided to illustrate specific embodiments of the present invention and is not intended to be limiting. Numerous variations and modifications within the scope of the present invention are possible. The present invention is set forth in the following claims.

What is claimed is:

1. A wireless power transmitter for wireless power transfer (WPT), the transmitter comprising:
   an input for receiving a WPT input signal;
   an output for connection to a transmit coil;
   a transmit circuit for converting the WPT input signal to a WPT output signal in the transmit coil, the transmit circuit comprising a processor and also comprising an inverter for generating the WPT output signal from the WPT input signal under control of the processor;
   wherein the transmit circuit is configured to:
   determine that the WPT output signal power is to be increased such that increasing the WPT output signal power comprises increasing a voltage amplitude of the WPT output signal; and
   in response to the determining, coordinate an increase of the voltage amplitude of the WPT output signal with a change of the WPT output signal frequency to increase the voltage amplitude of the WPT output signal while operating the inverter to move the WPT output signal frequency away from a resonant frequency of a resonant tank comprising the transmit coil.

2. The wireless power transmitter of claim 1, wherein moving the WPT output signal frequency away from the resonant frequency reduces or eliminates an increase of a magnetic field and/or magnetic field's power generated by the transmit coil from the WPT output signal when the WPT output signal voltage amplitude is increased.

3. The wireless power transmitter of claim 1, wherein increasing the WPT output signal voltage amplitude while moving the WPT output signal frequency is performed in response to a WPT receiver's command.

4. The wireless power transmitter of claim 3, wherein the transmit circuit is further configured, in response to the command, before or after increasing the WPT output signal voltage amplitude, to move the WPT output signal frequency closer to the resonant frequency to increase the WPT output signal power.

5. The wireless power transmitter of claim 4, wherein the WPT output signal voltage amplitude is held constant while the WPT output signal frequency moves closer to the resonant frequency.

6. The wireless power transmitter of claim 4, wherein the receiver's command requires increasing power transmitted by the transmit coil.

7. The wireless power transmitter of claim 1, wherein increasing the WPT output signal voltage amplitude comprises increasing the WPT input signal voltage.

8. The wireless power transmitter of claim 7, wherein the WPT input signal is a DC signal.

9. The wireless power transmitter of claim 1, wherein the transmit circuit comprises a memory, and is configured to engage in a calibration process with a wireless power receiver, the calibration process being performed when the wireless power receiver does not transfer power to a load, the calibration process comprising the transmitter transmitting wireless power to the receiver at a plurality of settings each of which defines the WPT output signal voltage amplitude, the frequency, and one or more transitions of the WPT output signal voltage amplitude and/or frequency, and the transmitter receiving, from the receiver, information on how each said setting affects a receiver voltage obtained in the receiver, and storing the settings and the corresponding information in the memory;
   wherein during the WPT, when the receiver transfers power to the load, the transmitter receives the receiver's commands specifying desired values for the receiver voltage, and the transmitter executes the commands based on the information stored in the memory for the settings.

10. The wireless power transmitter of claim 9, wherein at least one setting defines, for at least one transition, a length of a time interval to follow the transition without changing the WPT output signal voltage amplitude.

11. The wireless power transmitter of claim 9, wherein in the calibration process, the transmitter receives from the receiver, for at least one setting, an indication that the setting caused an excessively high voltage condition in the receiver and is not to be used in the WPT.

12. A method for wireless power transfer (WPT), the method comprising:
   receiving, by the wireless power transmitter of claim 1, an indication to increase the voltage amplitude of the WPT output signal;
   in response to the indication, increasing the voltage amplitude, and moving the WPT output signal frequency away from the resonant frequency, to reduce or eliminate the WPT signal's power increase associated with increasing the voltage amplitude.

13. The method of claim 12, further comprising, in response to the indication, before or after increasing the voltage amplitude, moving the WPT output signal frequency closer to the resonant frequency to increase the WPT output signal power.

14. The method of claim 12, wherein the voltage amplitude is held constant while the WPT output signal frequency moves closer to the resonant frequency.

15. The method of claim 12, wherein increasing the voltage amplitude comprises increasing the WPT input signal voltage.

16. The method of claim 15, wherein the WPT input signal is a DC signal.

17. A method for wireless power transfer (WPT), the method comprising:
   receiving, by a wireless power transmitter, an indication to increase a transmit coil voltage amplitude of a WPT signal transmitted by a transmit coil;
   in response to the indication, increasing the transmit coil voltage amplitude, and moving the WPT signal frequency away from a resonant frequency of a resonant circuit comprising the transmit coil, to reduce or eliminate the WPT signal's power increase associated with increasing the transmit coil voltage amplitude;
   wherein the transmit circuit comprises a memory, and is configured to engage in a calibration process with a wireless power receiver, the calibration process being performed when the wireless power receiver does not transfer power to a load, the calibration process comprising the transmitter transmitting wireless power to the receiver at a plurality of settings each of which defines the transmit coil voltage amplitude, the frequency, and one or more transitions of the transmit coil voltage amplitude and/or frequency, and the transmitter receiving, from the receiver, information on how each said setting affects a receiver voltage obtained in the receiver, and storing the settings and the corresponding information in the memory;

wherein during the WPT, when the receiver transfers power to the load, the transmitter receives the receiver's commands specifying desired values for the receiver voltage, and the transmitter executes the commands based on the information stored in the memory for the settings.

18. The method of claim 17, wherein at least one setting defines, for at least one transition, a length of a time interval to follow the transition without changing the transmit coil voltage amplitude.

19. A wireless power transmitter for wireless power transfer (WPT), the transmitter comprising:

an input for receiving a WPT input signal;

an output for connection to a transmit coil;

a transmit circuit for converting the WPT input signal to a WPT output signal in the transmit coil, the transmit circuit comprising a processor and also comprising an inverter for generating the WPT output signal from the WPT input signal under control of the processor;

wherein the transmit circuit is configured to:

determine that the WPT output signal power is to be decreased such that increasing the WPT output signal power comprises decreasing a voltage amplitude of the WPT output signal;

in response to the determining, coordinate a decrease of the voltage amplitude of the WPT output signal with a change of the WPT output signal frequency to decrease the voltage amplitude of the WPT output signal while operating the inverter to move the WPT output signal frequency toward a resonant frequency of a resonant tank comprising the transmit coil.

20. The wireless power transmitter of claim 19, wherein the transmitter is configured to decrease the voltage amplitude while moving the WPT output signal frequency in response to a WPT receiver's command requiring decreasing the transmitter's output power.

* * * * *